Figure 1:
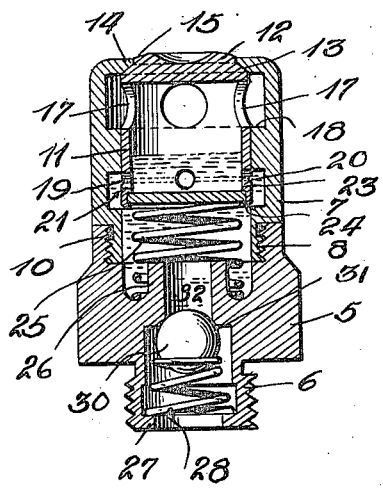

F. S. CRAVEN AND J. MIHALYI.
LUBRICATING GREASE CUP.
APPLICATION FILED DEC. 10, 1920.

1,424,557.

Patented Aug. 1, 1922.

Inventor
F. S. Craven
and J. Mihalyi
By T. A. Blair
Attorney

UNITED STATES PATENT OFFICE.

FRANCIS S. CRAVEN AND JOSEPH MIHALYI, OF WASHINGTON, DISTRICT OF COLUMBIA.

LUBRICATING-GREASE CUP.

1,424,557.    Specification of Letters Patent.    Patented Aug. 1, 1922.

Application filed December 10, 1920. Serial No. 429,782.

*To all whom it may concern:*

Be it known that we, FRANCIS S. CRAVEN and JOSEPH MIHALYI, citizens of the United States, residing at Washington, District of Columbia, have invented new and useful Improvements in Lubricating-Grease Cups, of which the following is a specification.

This invention relates to improvements in lubricators and has for one of its objects the provision of a simple, practical and inexpensive lubricating device, particularly adapted for use in connection with marine instruments, such as fire control devices where it is adapted to exclude water or water laden air from the interior of such instruments.

Another object is to provide an air tight lubricator of the above general character which will, at all times, maintain an oil seal over the inlet to the interior of the mechanism.

Another object of the invention is to provide an air tight lubricator wherein the lubricant is forcibly injected in the member to be lubricated.

Another object of the invention is to provide an air tight lubricator especially adapted to measure the proper amount of lubricant used in each operation of lubricating.

A further object of the invention is to provide an air tight lubricator insuring cleanliness and economy in the lubricant used.

A further object of the invention is to provide an air tight lubricator wherein the proportionment of volumes of lubricant within the lubricator insures the complete absorption of the lubricant injected when operating the device.

It frequently happens in instruments of the above character that the motor contained therein while in operation materially heats the air within the instrument causing an expansion and consequent increase in pressure. This air, owing to the increase in pressure, would pass out through any openings existing in the casing, and on reduction of the temperature and pressure after the electric power is cut off there would be a corresponding inflow of air.

The incoming air being more or less moisture laden would gradually reach a point of saturation after a number of repetitions of the cycle and on condensation would produce within the instrument casing what is known as "sweating."

It is one of the objects to avoid this condition by eliminating all openings in casings, however small, thus stopping the inflow of air. The present device accomplishes this object in so far as oiling holes are concerned and besides accomplishing the above objects also permits ease and quickness of operation in that it is unnecessary to unscrew or screw or otherwise to manipulate a cover or fastening as in the oil plugs heretofore used. There is no danger of loss of parts and there is also the assurance that after each operation of lubricating all the parts are returned to a completely air tight position.

Figure 2:
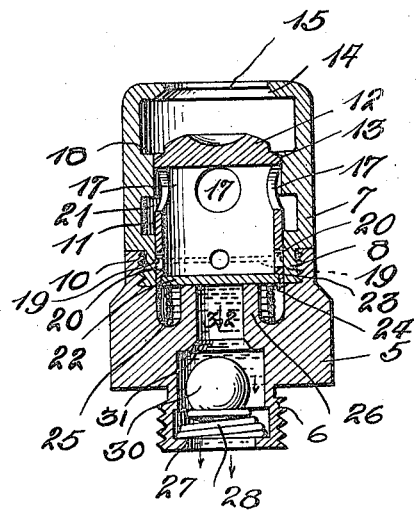

In the accompanying sheet of drawings illustrating a preferred embodiment of the present invention and in the several views of which corresponding parts are indicated by similar reference numerals, Figure 1 is a vertical sectional view of the device in normal position. Figure 2 is a similar view showing the device in the position when oil is being forced through the cup to the mechanism to be lubricated.

The invention includes a lubricant receptacle 5 preferably designed to contain the proper amount of lubricant supplied during each operation of lubricating. The receptacle 5 has a threaded neck 6 adapted to engage a tapped opening adjacent the member to be lubricated, and is also provided with a filling chamber 7, having a threaded neck 8, engaging a threaded opening 10, at the upper end of the receptacle 5. The filling chamber 7 forms a housing for a tubular plunger 11, having spaced relation with the filling chamber 7. The tubular plunger 11 is preferably drawn from a metal disc and is provided with a head 12, beveled at 13, to seat against a ground face 14, of an opening 15 in the filling chamber 7.

Adjacent the head 12, the plunger 11 is provided with ports 17, arranged at intervals therein. In normal position the main body portion of the plunger 11 is embraced by a circumferential cylindrical guide and sealing flange 18, in the filling chamber 7, the ports 17 being above the flange 18, as clearly shown in Figure 1. That portion of the plunger 11 immediately below the flange 18 includes a groove 19 having ports 20 arranged at intervals therein. The ports 20 normally connect the interior of the plunger 11 with an annular groove 21 in the filling chamber 7, the lower cylindrical portion of the plunger 11 being slightly above the bottom of the groove 21 in the normal position as shown in Figure 1. The lower cylindrical portion of the plunger 11 is provided with an oil tight head formed by means of a disc 22 securely and tightly sweated against an annular shoulder 23 and flange 24. The plunger 11 is held against depression by an expansible spring 25 within the lubricator, one end of the spring 25 bearing against the disc 22, and the opposite end coacting with a recess formed between the inner wall of the receptacle 5 and a tubular extension 26. The neck 6 has an internal annular flange 27 on which is seated a conical spring 28 holding a ball valve 30 against a seat 31 at the bottom of a duct 32 in the receptacle 5, this construction constituting a non-return valve.

The plunger 11, movable within the lubricator, supplies lubricant from the filling chamber 7 to the receptacle 5 and the proportionment of volumes above and inside the plunger 11 is such that complete absorption of the lubricant injected above the piston during the operation of lubricating is assured.

In operation it will be assumed that the receptacle 5 has been supplied with lubricant as indicated in Figure 1, by previous operations of lubricating. In practice, the plunger 11 is depressed by the end of the tubular stem of the usual diaphragm-bottomed type of lubricant container. The depression of the plunger 11 against the action of the spring 25 causes the lower cylindrical portion of the plunger 11 to close the groove 21, trapping below the plunger 11 the lubricant in the receptacle 5. Further depression of the plunger 11 against the head of lubricant within the receptacle 5 unseats the valve 30 against the action of the spring 28, forcing the lubricant within the receptacle 5 to pass through the duct 32 and the neck 6 to the member to be lubricated. The head 15 in the extreme lowered position of the plunger 11, coacting with the flange 18 within the cap 7 seals the filling chamber 7 from the interior of the plunger 11, preventing the lubricant being supplied from entering the plunger 11. On release the spring 25 acts to return the plunger 11 to its normal position. Due to a partial vacuum being formed thereby within the lubricator, the plunger 11 returns slowly, oil from the groove 19 leaking past the lower rim of the plunger 11, gradually uncovering the ports 17, and allowing the lubricant which has been supplied above the head 15 to enter the plunger 11. The main cylindrical portion of the plunger 11 coacting with the flange 18 on return of the plunger 11 to its normal position assists in maintaining a constant oil seal to prevent the entrance of air and moisture within the lubricator. The combined volume included within the plunger 11 and the annular recess 21 being greater than the volume below the plunger 11, through which it sweeps when operated, further assists to maintain a complete oil seal at all times. It thus will be seen that at all times during the operation of lubricating a constant oil seal is maintained over the duct 32. In actual practice the slow return of the plunger 11 terminates in an accelerated movement thereof, due to the lower cylindrical portion of the plunger 11 with the disc 15 having passed above the bottom of the groove 21 after the ball valve 30 has been seated by the spring 28, permitting the lubricant within the plunger 11 to pass rapidly through the ports 20 to the receptacle 5. It will, of course, be understood that on release, the tubular plunger 11 drains the lubricant from the filling chamber 7 through the ports 17.

Without further analysis, the foregoing will so fully reveal the gist of this invention that others by applying current knowledge can adapt it readily for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What we claim is:—

1. A lubricator including a main body portion, a hollow cylindrical piston movable within said body portion and dividing the same into two chambers, a valve associated with the piston adapted to close the entrance to said body portion and a second valve adapted to close the outlet from said body portion, said piston having openings adapted to conduct oil from one chamber to the other simultaneously with the forcing of the oil out of said body portion.

2. In an air tight lubricator of the character described, in combination, a body portion provided with inlet and outlet openings, a movable hollow piston within said body portion having openings near the upper and lower parts thereof, a valve associated with the piston adapted to close the entrance to said body portion and a spring actuated valve adapted to close the outlet from said body portion whereby as said piston is depressed to fill the upper chamber the lubricant is simultaneously expelled from the lower chamber past said second mentioned valve.

3. In an air tight lubricator of the character described, in combination, a hollow body portion provided with inlet and outlet openings at its opposite ends, a hollow movable cylindrical piston slidable within said body portion and dividing the same into upper and lower chambers, spring actuated valves for closing the entrance and outlet openings in said body portion, said piston having openings communicating with said chambers and the interior of the piston whereby as said piston is depressed to fill the upper chamber lubricant previously admitted thereto will flow into said lower chamber and be expelled past the valve at the outlet to said body portion.

Signed at Washington, District of Columbia, this 6th day of December, 1920.

FRANCIS S. CRAVEN.
JOSEPH MIHALYI.